United States Patent [19]
Miyaji et al.

[11] Patent Number: 5,748,970
[45] Date of Patent: May 5, 1998

[54] INTERRUPT CONTROL DEVICE FOR PROCESSING INTERRUPT REQUEST SIGNALS THAT ARE GREATER THAN INTERRUPT LEVEL SIGNALS

[75] Inventors: Shinya Miyaji, Nara; Nobuo Higaki, Osaka, both of Japan

[73] Assignee: Matsushita Electric Industrial Co., Ltd., Kadoma, Japan

[21] Appl. No.: 640,082

[22] Filed: Apr. 30, 1996

[30] Foreign Application Priority Data

May 11, 1995 [JP] Japan ................................. 7-113130

[51] Int. Cl.$^6$ ......................... G06F 9/46; G06F 13/24
[52] U.S. Cl. .................... 395/733; 395/737; 395/739; 395/868
[58] Field of Search ..................... 395/733, 734, 395/737, 738, 742, 860, 868, 870, 739

[56] References Cited

U.S. PATENT DOCUMENTS

| | | | |
|---|---|---|---|
| 4,352,157 | 9/1982 | Namimoto et al. | 395/412 |
| 4,459,657 | 7/1984 | Murao | 395/421.1 |
| 4,523,277 | 6/1985 | Schnathorst | 395/870 |
| 5,155,853 | 10/1992 | Mitsuhira et al. | 395/734 |
| 5,367,676 | 11/1994 | Katori | 395/734 |
| 5,557,766 | 9/1996 | Takiguchi et al. | 395/405 |

FOREIGN PATENT DOCUMENTS

| | | |
|---|---|---|
| 306042 | 3/1989 | European Pat. Off. . |
| 637802 | 5/1995 | European Pat. Off. . |
| 4-169937 | 6/1992 | Japan . |

*Primary Examiner*—Gopal C. Ray
*Attorney, Agent, or Firm*—Price, Gess & Ubell

[57] ABSTRACT

An interrupt control device of an embedded microcomputer including I/O devices and a processor core comprising: a program storage unit for storing interrupt processing programs, each corresponding to an interrupt level of an interrupt request signal, in sequential areas; a start address hold unit for holding start addresses, which can be updated, of the interrupt processing programs; a level hold unit for holding an interrupt level, which can be updated, of each interrupt signal inputted from the I/O devices; an interrupt reception unit for, when at least one of the interrupt signals is inputted, receiving an interrupt signal of a highest interrupt level out of the inputted interrupt signals and outputting an interrupt request signal of the same interrupt level; and a control unit for controlling a branch, when the interrupt request signal is outputted, by fetching one of the start addresses which corresponds to the interrupt level of the interrupt request signal from the start address hold unit and setting the start address in the program counter.

12 Claims, 5 Drawing Sheets

Fig. 2A

| IRQn | program capacity of interrupt processing | start address | IRQVn | area |
|---|---|---|---|---|
| 0 | 8kbyte(2000h) | 40000010h | 0010h | 40000010h~4000200Fh |
| 1 | 4kbyte(1000h) | 40002010h | 2010h | 40002010h~4000300Fh |
| 2 | 2kbyte(0800h) | 40003010h | 3010h | 40003010h~4000380Fh |
| 3 | 1kbyte(0400h) | 40003810h | 3810h | 40003810h~40003C0Fh |
| 4 | 0.5kbyte(0200h) | 40003010h | 3B10h | 40003C10h~40003E0Fh |
| 5 | 0.5kbyte(0200h) | 40003E10h | 3D10h | 40003E10h~4000410Fh |
| 6 | 0.5kbyte(0200h) | 40004110h | 3F10h | 40004110h~4000430Fh |

Fig. 2B

```
MOV #x'0010',D1      ; immediate data 0010h → D1
MOV D1,IRQV0         ; D1 → IRQV0
MOV #x'2010',D1      ; immediate data 2010h → D1
MOV D1,IRQV1         ; D1 → IRQV1
MOV #x'3010',D1      ; immediate data 3010h → D1
MOV D1,IRQV2         ; D1 → IRQV2
MOV #x'3810',D1      ; immediate data 3810h → D1
MOV D1,IRQV3         ; D1 → IRQV3
MOV #x'3C10',D1      ; immediate data 3C10h → D1
MOV D1,IRQV4         ; D1 → IRQV4
MOV #x'3E10',D1      ; immediate data 3E10h → D1
MOV D1,IRQV5         ; D1 → IRQV5
MOV #x'4110',D1      ; immediate data 4110h → D1
MOV D1,IRQV6         ; D1 → IRQV6
```

Fig. 5A

| ICRn | level field | IE |
|------|-------------|----|
| ICR0 | 000b | 1 |
| ICR1 | 001b | 1 |
| ICR2 | 010b | 1 |
| ICR3 | 010b | 1 |
| ICR4 | 010b | 1 |
| ICR5 | 010b | 1 |
| ICR6 | 011b | 1 |

Fig. 5B

| IRQn | program capacity of interrupt processing | IRQVn | area |
|------|------------------------------------------|-------|------|
| 0 | 8kbyte(2000h) | 40000010h | 40000010h~4000200Fh |
| 1 | 4kbyte(1000h) | 40002010h | 40002010h~4000300Fh |
| 2 | 16kbyte(4000h) | 40003010h | 40003010h~4000700Fh |
| 3 | 1kbyte(0400h) | 40007010h | 40007010h~4000740Fh |

Fig. 5C

```
MOV #x'00001000',D1      ; immediate data 00001000h → D1
MOV D1,ICR0              ; D1 → ICR0
MOV #x'00003000',D1      ; immediate data 00003000h → D1
MOV D1,ICR1              ; D1 → ICR1
MOV #x'00005000',D1      ; immediate data 00005000h → D1
MOV D1,ICR2              ; D1 → ICR2
MOV D1,ICR3              ; D1 → ICR3
MOV D1,ICR4              ; D1 → ICR4
MOV D1,ICR5              ; D1 → ICR5
MOV #x'00007000',D1      ; immediate data 00007000h → D1
MOV D1,ICR6              ; D1 → ICR6
MOV #x'40000010',D1      ; immediate data 40000010h → D1
MOV D1,IRQV0             ; D1 → IRQV0
MOV #x'40002010',D1      ; immediate data 40002010h → D1
MOV D1,IRQV1             ; D1 → IRQV1
MOV #x'40003010',D1      ; immediate data 40003010h → D1
MOV D1,IRQV2             ; D1 → IRQV2
MOV #x'40003810',D1      ; immediate data 40007010h → D1
MOV D1,IRQV3             ; D1 → IRQV3
```

INTERRUPT CONTROL DEVICE FOR PROCESSING INTERRUPT REQUEST SIGNALS THAT ARE GREATER THAN INTERRUPT LEVEL SIGNALS

BACKGROUND OF THE INVENTION (1) Field of the Invention

The present invention relates to an interrupt control device having excellent flexibility for customizing interrupt program designs in a microcomputer.

(2) Description of the Related Art

Recently, as electronic technique and information processing techniques have been developed, the performance of microprocessors has been upgraded. They are now widely used in various electronic devices.

The following two methods have been applied to a conventional interrupt control device used in information processing devices like microprocessors and the like: method of vectored interrupt in which a start address of an interrupt processing program is different for each interrupt factor; and method of fixed address in which a start address of an interrupt processing program is fixed for each interrupt level.

Method of vectored interrupt is used in an 8086 microprocessor of U.S. Intel, Inc., an SH7032 microprocessor of Hitachi, Ltd. and the like. In this method of vectored interrupt, a vector number is assigned to each interrupt factor. When an interrupt occurs, a program in operation branches to an interrupt processing program. At this time, a vector table which stores the start address of each interrupt processing program is referred to, the each start address corresponding to a vector number. Normally, vector numbers are expressed by eight bits, which enables dealing with 256 interrupt factors. The vector table is 1 Kbyte long when each address is expressed by 32 bits.

When an interrupt occurs, the interrupt control device used in the method of vectored interrupt generates a vector number corresponding to an interrupt factor, and reads the start address of an interrupt processing program from the vector table, the start address corresponds to the vector number. Then, the interrupt control device causes an address of a program in operation to branch to the start address of an interrupt processing program. Specifically, such a branch is controlled by hardware such as a microprogram and the like. After the branch, the interrupt processing program is executed. When the execution of the interrupt processing program is completed, the original program's operation is started again at the point at which it was interrupted by control of hardware.

For the method of vectored interrupt, a programmer creates an interrupt processing program for each interrupt factor, places the first address of each program into the vector table as the start address. Then, a processing program of each interrupt factor is started by control of hardware. This method is suitable for an information processing device for executing various kinds of applications of general versatility.

Method of fixed address is used in a V810 microprocessor of Nippon Electronic Cooperation, and the like. For 16 interrupt levels, 16 start addresses of interrupt processing programs are fixed at FFFFFEnOh (n=0–Fh). In other words, 16 start addresses are fixed at every 16th bytes.

When an interrupt occurs, the interrupt control device used in the method of fixed address causes a branch from an address of a program in operation to the fixed start address corresponding to an interrupt level. Specifically, such a branch is controlled by hardware. As there is no need to refer to the vector table in this method, a high-speed branch can be realized compared to the method of vectored interrupt.

However, the above mentioned interrupt control device used in the method of vectored interrupt has the following drawbacks: hardware configuration becomes complicated and a circuit size becomes big due to generation of vector numbers and reference to the vector table, and it takes a long time for a program in operation to branch to an interrupt processing program when an interrupt occurs. Especially, when the interrupt control device is used in an embedded microcomputer, as the capacity of the built-in ROM is limited, the presence of the vector table reduces room for other programs. And as the number of interrupt signals which are actually used is fewer than vector numbers, there are areas which are not used in the vector table. Therefore the ROM cannot be not used efficiently.

The above mentioned interrupt control device used in the method of fixed address has a following drawback: after a branch to the fixed start address of an interrupt processing program is caused by hardware, it is necessary to cause one more branch from the start address of the interrupt processing program by a branch instruction, as the fixed start addresses corresponding to interrupt levels are placed at short intervals (for example, at every 16 bytes). Therefore, it takes a long interrupt processing time. If the intervals between the fixed start addresses are wide enough to allow interrupt processing programs, it is possible to speed up the interrupt processing, but the ROM cannot be used efficiently.

An interrupt control device of an embedded microcomputer should satisfy the following two requests.

One is that an interrupt level, which shows priority of an interrupt signal, should be set flexibly. This is because an interrupt control device used in an embedded microcomputer is a single chip into which many different types of I/O devices are installed, the combination of I/O devices being determined based on the intended use of the microcomputer. Here, each interrupt signal from an I/O device should be treated differently according to the use of the microcomputer.

The other is that the interrupt control device should be of small chip area so as to allow the installation of many other I/O devices on the same chip.

SUMMARY OF THE INVENTION

It is an object of the present invention to provide an interrupt control device of a small hardware size, which is capable of dealing with different combinations of I/O devices flexibly and used in an imbedded microcomputer.

The object can be achieved by the following features.

(1) An interrupt control device of an embedded microcomputer including I/O devices and a processor core comprising: a program storage unit for storing interrupt processing programs, each corresponding to an interrupt level of an interrupt request signal, in sequential areas; a start address hold unit for holding start addresses, which can be updated, of the interrupt processing programs; a level hold unit for holding an interrupt level, which can be updated, of each interrupt signal inputted from the I/O devices; an interrupt reception unit for, when at least one of the interrupt signals is inputted, receiving an interrupt signal of a highest interrupt level out of the inputted interrupt signals and outputting an interrupt request signal of the same interrupt level; and a control unit for controlling a branch, when the interrupt request signal is outputted, by fetching one of the start addresses which corresponds to the interrupt level of the interrupt request signal from the start address hold unit and setting the start address in the program counter.

According to the above construction, as the interrupt signal from outside of the processor core is converted into an interrupt request signal which has an interrupt level of the level hold unit, an interrupt level of an interrupt signal from an I/O device can be set flexibly. And, as a vector table and hardware for converting a vector into an interrupt request signal becomes unnecessary, the hardware size can be minimized. Therefore, chip area of the interrupt control device for the embedded microcomputer can be minimized. It is possible to set interrupt levels of interrupt signals from I/O devices, which are customized for each intended use of the microcomputer, flexibly. And it is also possible to increase areas for installation.

(2) The start address hold unit may include: a low-order address hold unit for holding a low-order address of the start address of the interrupt processing program of each level; a constant generation unit for generating a constant to be used as a high-order address of the start address, and wherein the control unit controls the branch to the start address composed of the low-order address of the low-order address hold unit and the high-order address generated from the constant generation unit when the interrupt request signal occurs, the high-order and low-order addresses corresponding to the interrupt level of the interrupt request.

According to the above construction, it is possible to minimize the hardware size and save cost by using the same high-order address of a start address for each interrupt level.

(3) The start address hold unit may include: a first hold unit for holding a leading address of the sequential areas of interrupt processing programs in the program storage unit as a base address; and a second hold unit for holding a relative start address expressed by a differential between the start address of each interrupt processing program and the base address, the relative start address corresponding to an interrupt level of each interrupt processing program, wherein the control unit controls the branch to the start address when the interrupt request occurs, the start address being obtained by adding the base address and the relative start address, each corresponding to the interrupt level of the interrupt request.

According to the above construction, it is possible to calculate a start address more flexibly. Moreover, if the allocated sequential storage areas of the interrupt processing programs is changed, changing the base address can cope with that. If individual interrupt processing program is changed, changing the relative start address can cope with that. Therefore, it is possible to design a program more flexibly.

(4) The interrupt control device of (1) may further comprise a fixed address generation unit for generating a start address of an interrupt processing program for a specific non-maskable interrupt signal, and wherein the control unit controls a branch to the start address generated by the fixed address generation unit when the specific non-maskable interrupt signal occurs.

According to the above construction, it is possible to distinguish a specific non-maskable interrupt signal mainly used for emergency from an interrupt signal frequently used by an application.

(5) One interrupt request signal having an interrupt level higher than a predetermined level may correspond to one interrupt processing program in the program storage unit, and a plurality of interrupt request signals, each having an interrupt level one of equal to and lower than the predetermined level, may correspond to one interrupt processing program in the program storage unit, and wherein the start address hold unit includes: a first hold unit for holding the start address corresponding to the interrupt level higher than the predetermined level; and a second hold unit for holding the start address corresponding to a plurality of interrupt levels which are one of equal to and lower than the predetermined level.

According to the above construction, for an interrupt request signal of a high priority level, quickness and promptness can be guaranteed for sure. And, hardware configuration can be simplified by packing interrupt signals of low priority levels into one interrupt processing program, thereby realizing flexible interrupt control depending on characteristics needed for each interrupt processing.

(6) The level hold unit may include the same number of interrupt control registers as the interrupt signals, each interrupt control register having an interrupt level setting field.

(7) The interrupt control device of (6) may further include: a first initialization unit for setting each start address of the interrupt processing programs in the start address hold unit right after the microcomputer is activated; and a second initialization unit for setting each level of the interrupt processing programs in the interrupt control registers right after the microcomputer is activated.

According to the above construction, dynamic switching between interrupt processing programs during one interrupt factor is possible. When an interrupt factor of IPT6 is a timer interrupt used for measuring intervals between buzzing times and intervals between warnings on display, it is possible to switch interrupt processing programs by storing the start address of an interrupt processing program which supports the former case or the start address of an interrupt program which supports the latter case in the start address hold unit according to necessity.

(8) The interrupt control device of (7) may further include a setting change unit for dynamically changing, when the microcomputer is in activation, at least one of the level in the interrupt control register and a start address in the start address hold unit corresponding to one of the interrupt processing programs.

(9) The program storage unit may further include a first program for setting each start address of the interrupt processing programs in the start address hold unit and a second program for setting each level of the interrupt processing programs in the interrupt control registers, wherein the first and the second programs are executed by the processor core right after the microcomputer is activated.

(10) The program storage unit may further include a third program for changing at least one of the level in the interrupt control register and the start address in the start address hold unit, each corresponding to one of the interrupt processing programs, wherein the third program is dynamically executed by a processor core when the microcomputer is in activation.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2A is an example of setting IRQVn register in Embodiment 1;

FIG. 2B is an example of a program for the above setting in Embodiment 1;

FIG. 5A shows an example of setting interrupt control registers ICR0–ICR6F of Embodiment 2;

FIG. 5B shows an example of setting start address registers IRQV0–IRQV6; and

FIG. 5C is an example of setting a program for the above setting in the Embodiment 2.

DESCRIPTION OF THE PREFERRED EMBODIMENT (Embodiment 1)

Figure 1:
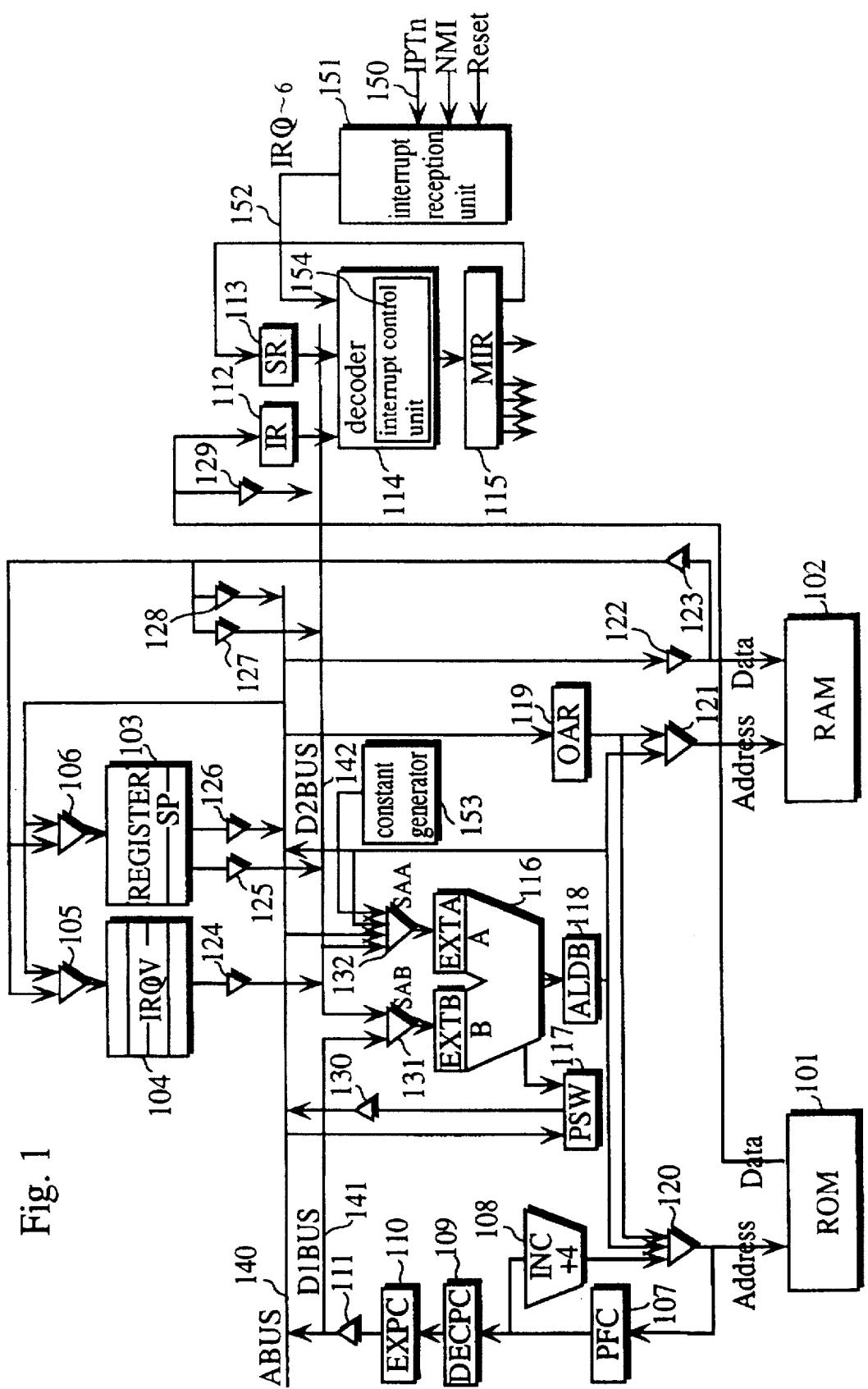
FIG. 1 is a block diagram showing a configuration of a processor comprising an interrupt control device of Embodiment 1 of the present invention.

FIG. 1 is a block diagram showing configuration of a processor comprising an interrupt control device of Embodiment 1 of the present invention.

The present processor comprises ROM 101, RAM 102, register unit 103, start address register 104, selector 105, selector 106, pre-fetch counter 107, incrementor 108, decode program counter 109, execution program counter 110, driver 111, instruction register 112, status register 113, decoder 114, microinstruction register 115, arithmetic logic operation unit 116, processor status word 117, operation result buffer 118, operand address register 119, selector 120, selector 121, drivers 122–130, selectors 131 and 132, internal address bus 140, internal data bus 141, internal data bus 142, interrupt signals 150, interrupt reception unit 151, constant generator 153, and interrupt control unit 154 in decoder 114.

ROM 101 and RAM 102 store instructions and data, respectively. Instruction word, address, and data are 32 bits long.

Register unit 103 is composed of a plurality of registers. In the present embodiment, they are data registers, address registers, and a stack pointer, each of them being 32 bits long.

Start address registers 104 is composed of seven registers (IRQV0–IRQV6), each corresponding to interrupt level signals 152 (level 0–level 6). Each of IRQV0–IRQV6 holds low-order 16 bits of the start address of an interrupt processing program which corresponds to an interrupt level from level 0–level 6. For example, IRQV2 holds low-order 16 bits of the start address of an interrupt processing program of interrupt level 2. Such start address is set by usual transfer instructions (MOV instructions) which exists at the outset of a program (main routine) or other necessary places. A predetermined high-order 16 bits are added to the start address by control of interrupt control unit 154 when an interrupt request occurs. Then, the start address is supplied to ROM 101 as a fetch address and stored in pre-fetch counter 107 at the same time.

Selectors 105 and 106 select data from RAM 102 or data on internal address bus 104. Selector 105 outputs the selected data to start address register 104, and selector 106 outputs the selected data to register unit 103.

Pre-fetch counter 107 and incrementor 108 constitute a counter which sequentially generates addresses of instructions to be fetched according to control of decoder 114.

Decode program counter 109 holds an address of an instruction in an instruction decoding stage.

Execution program counter 110 holds an address of an instruction in an instruction execution stage.

Driver 111 outputs the address of an instruction in execution program counter 110 to internal data bus 141 according to control of decoder 114.

Instruction register 112 holds an instruction which is fetched from ROM 101.

Status register 113 holds various status flags which are necessary for decoding instructions.

Decoder 114 decodes the instruction in instruction register 112 and the contents of status register 113, and outputs microinstructions to realize the instruction. Decoder 114 comprises interrupt control unit 154 inside, which controls a branch to an interrupt processing program and return to the previous program.

Microinstruction register 115 outputs control signals so that the microinstruction from decoder 114 is realized.

Arithmetic logic operation unit 116 carries out data operation and address calculation according to control of decoder 114.

Processor status word 117 holds various flags showing internal status of a processor, including IMSK field (interrupt mask field) which designates a possible range of level interruptions.

Operation result buffer 118 holds an operation result generated by arithmetic logical operation unit 116.

Operand address register 119 holds an address of RAM 102.

Selector 120 selects and outputs one of a fetch address from incrementor 108, an operation result in operation result buffer 118, and an address in operand address register 119 to ROM 101 according to control of decoder 114.

Selector 121 selects and outputs an operation result in operation result buffer 118 or an address in operand address register 119 according to control of decoder 114.

Drivers 122–130 are three-state drivers which drive data/address according to the control signals from microinstruction register 115.

Selector 131 selects and outputs data from internal data bus 141 or internal data bus 142 to one of two input ports of arithmetic logic operation unit 116.

Selector 132 selects and outputs data from one of internal data bus 142, internal address bus 140, operation result buffer 118, and constant generator 153 to the other input port of arithmetic logic operation unit 116.

Interrupt signals 150 are seven signals (IPT0–IPT6), which post interrupt requests from various I/O devices outside of the processor to interrupt reception unit 151.

Interrupt reception unit 151 receives level interrupts, a non-maskable interrupt, and a reset interrupt, and posts them to decoder 114. One level interrupt occurs due to an interrupt signal. Interrupt signals (IPT0–IPT6) are converted to interrupt level signals (IRQ0–IRQ6). The non-maskable interrupt has a higher priority than a level interrupt, and can be received at any time. The reset interrupt has the highest priority, and this is an interrupt for doing processing necessary for reset. Input reception unit 151 comprises interrupt control registers inside, each corresponding to interrupt signals (IPT0–IPT6), and outputs an interrupt level signal according to an interrupt control register when an interrupt signal is inputted. In each interrupt control register, an interrupt level, which should occur when an interrupt signal is inputted, is set. In the present embodiment, IRQ0–IRQ6 which corresponds to IPT0–IPT6, respectively, are outputted. Interrupt reception unit 151 outputs a non-maskable interrupt signal (NMI) and a reset interrupt signal to decoder 114, without converting them.

Interrupt level signals 152 are IRQ0–IRQ6, the precedence decreasing one by one from IRQ0. Interrupt level signals 152 request interrupt processing from decoder 114.

Constant generator 153 generates 16-bit and 32-bit constants. Here, the 16-bit constant represents high-order 16 bits of the start address of processing of the level interrupt. Two 32-bit constants are generated: one is the start address of interrupt processing of NMI; and the other is the start address of interrupt processing of the reset interrupt. In the present embodiment, the 16-bit constant is 4000h, the start address of processing of NMI is set at 40000008h, and the start address of processing of the reset interrupt is set at 40000000h.

Interrupt control unit 154 is actually a part of decoder 114. When one of interrupt level signals 152 is inputted, interrupt control unit 154 issues microinstructions to control a branch to interrupt processing program.

Specifically, interrupt control unit 154 issues the following microinstructions when IRQn (n=0–6) is inputted: (1.1) a microinstruction to update the stack pointer (SP-8→SP); (1.2) a microinstruction to save the contents of execution program counter 110 on the stack (EXPC→(SP-4)); (1.3) a microinstruction to save the contents of processor status word 117 on the stack (PSW→SP); (1.4) a microinstruction to update IMSK field in processor status word 117 to an interrupt level of IRQn; (1.5) a microinstruction to make arithmetic logic operation unit 116 add the start address in IRQVn corresponding to the level of the IRQn and the 16-bit constant in constant generator 153; and (1.6) a microinstruction to output a result of the addition to ROM 101 and store it in pre-fetch counter 107 at the same time.

Interrupt control unit 154 issues the following microinstructions when the reset interrupt is inputted:(2.1) a microinstruction to output two 32-bit constants in constant generator 153 through arithmetic logic operation unit 116, the two 32-bit constants showing the start address of the reset interrupt; and (2.2) a microinstruction to output a result from arithmetic logic operation unit 116 to ROM 101 and store it in pre-fetch counter 107 at the same time.

Interrupt control unit 154 issues the following microinstructions when an NMI is inputted: (3.1) a microinstruction to update the stack pointer (SP-8→SP); (3.2) a microinstruction to save the contents of execution program counter 110 on the stack (EXPC→(SP-4)); (3.3) a microinstruction to save the contents of processor status word 117 on the stack (PSW→SP); (3.4) a microinstruction to output two 32-bit constants in constant generator 153 through arithmetic logic operation unit 116, the two 32-bit constants showing the start address of an NMI; (3.5) and a microinstruction to output a result from arithmetic logic operation unit 116 to ROM 101 and store it in pre-fetch counter 107 at the same time.

The number of microinstructions is not necessarily fixed as mentioned above. So long as the contents are reserved, any other number is possible and they can even be consolidated into one microinstruction.

The following explanation touches on operations of the interrupt control device of Embodiment 1 of the present invention.

First, interrupt start address register IRQVn is set as follows.

FIG. 2A is an example of setting IRQVn. In FIG. 2A, interrupt processing programs from level 0 to level 6 have the size of are 8 Kbytes (2000h bytes), 4 Kbytes (1000h bytes), 2 Kbytes (800h bytes), 1 Kbyte (400h bytes), 0.5 Kbyte (200h bytes), 0.5 Kbyte (200h bytes), and 0.5 Kbyte (200h bytes), respectively. For example, if the start address of an interrupt processing program of level 0 is set at 40000010h, IRQV0 is set at 0010h. Then, the interrupt processing program is located between 40000010h and 4000200Fh. In order to locate an interrupt processing program of level 1 right after that, IRQV1 should be set at 2010h. Likewise, IRQV2, IRQV3, IRQV4, IRQV5, and IRQV6 should be set at 3010h, 3810h, 3C10h, 3E10h, and 4110h, respectively, so that the interrupt processing programs are located without intervals.

FIG. 2B is an example of a program for the above setting. IRQVn is set by transfer instructions (MOV instructions).

The next explanation is about a branch to an interrupt processing program of the level interrupt.

Here, each IRQVn is set as described above, and input request signal IPT3 is inputted.

Input request signal IPT3 is converted to interrupt level signal IRQ3 of level 3 by interrupt reception unit 151, and outputted to decoder 114. Interrupt control unit 154 in decoder 114 issues the following microinstructions when interrupt level signal IRQ3 is inputted: (1.1) the microinstruction to update the stack pointer (SP-8→SP); (1.2) the microinstruction to save the contents of execution program counter 110 on the stack (EXPC→(SP-4)); (1.3) the microinstruction to save the contents of processor status word 117 on the stack (PSW→SP); (1.4) the microinstruction to update IMSK field in processor status word 117 to an interrupt level of IRQ3; (1.5) the microinstruction to make arithmetic logic operation unit 116 add the start address in IRQV3 corresponding to the IRQ3 and a 16-bit constant in constant generator 153; and (1.6) the microinstruction to output a result of the addition to ROM101 and store it in pre-fetch counter 107 at the same time.

Microinstruction register 115 outputs various control signals in order to realize the microinstructions mentioned above. Depending on microinstructions from (1.1)–(1.4), microinstruction register 115 outputs control signals so that stack pointer is updated or previous address and PSW are saved.

According to the microinstruction of (1.5), microinstruction register 115 outputs control signals so that arithmetic logic operation unit 116 adds low-order 16 bits (3810h) of the start address of an interrupt processing program of IRQV3, which corresponds to IRQ3, and the 16-bit constant (4000h) in constant generator 153 as high-order 16 bits (IRQV3→driver 124→selector 131→one of the two ports of arithmetic logic operation unit 116, constant generator 153→selector 132→the other port of arithmetic logic operation unit 116, arithmetic logic operation unit 116→operation result buffer 118).

According to the microinstruction of (1.6), microinstruction register 115 outputs control signals so that the result of addition (40003810h) is outputted to ROM 101 as a fetch address (operation result buffer 118→selector 120→ROM 101) and stored in pre-fetch counter 107 at the same time (selector 120→pre-fetch counter 107). Then, a program in operation branches to the address at 40003810h, so that an interrupt processing program of level 3 stored between 40003810h and 40003C0Fh is executed.

As mentioned above, according to the interrupt control device of the present embodiment, for each interrupt level signal 152 (IRQ0–IRQ6), the start address can be set arbitrarily by constant generator 153 and start address register 104. Therefore, interrupt processing programs for each level can be located sequentially in ROM 101, so ROM 101 can be used efficiently. Moreover, as the interrupt processing programs do not bifurcate, a branch instruction for further branching to the main part of the interrupt processing programs after a branch to the start of the processing programs is not necessary. So high-speed interrupt processing can be realized.

Moreover, according to the present interrupt control device, a vector table is not necessary. So hardware configuration becomes simple.

Moreover, as arithmetic logic operation unit 116 comprises more complicated address calculation function, it can calculate the start address by some operations, not by simple synthesizing as mentioned in the present embodiment. For example, the start address of an interrupt processing program can be calculated by a 32-bit base address+16-bit relative address. In such a case, a base address register is used instead of constant generator 153. The base address register holds the leading address of an area of a plurality of interrupt processing programs in ROM 101 as base address. And start address register 104 holds the relative start address corresponding to an interrupt level: the relative start address is a differential between the start address of each interrupt processing program and the base address. In this way, more flexible program design can be realized.

(Embodiment 2)

Figure 3:
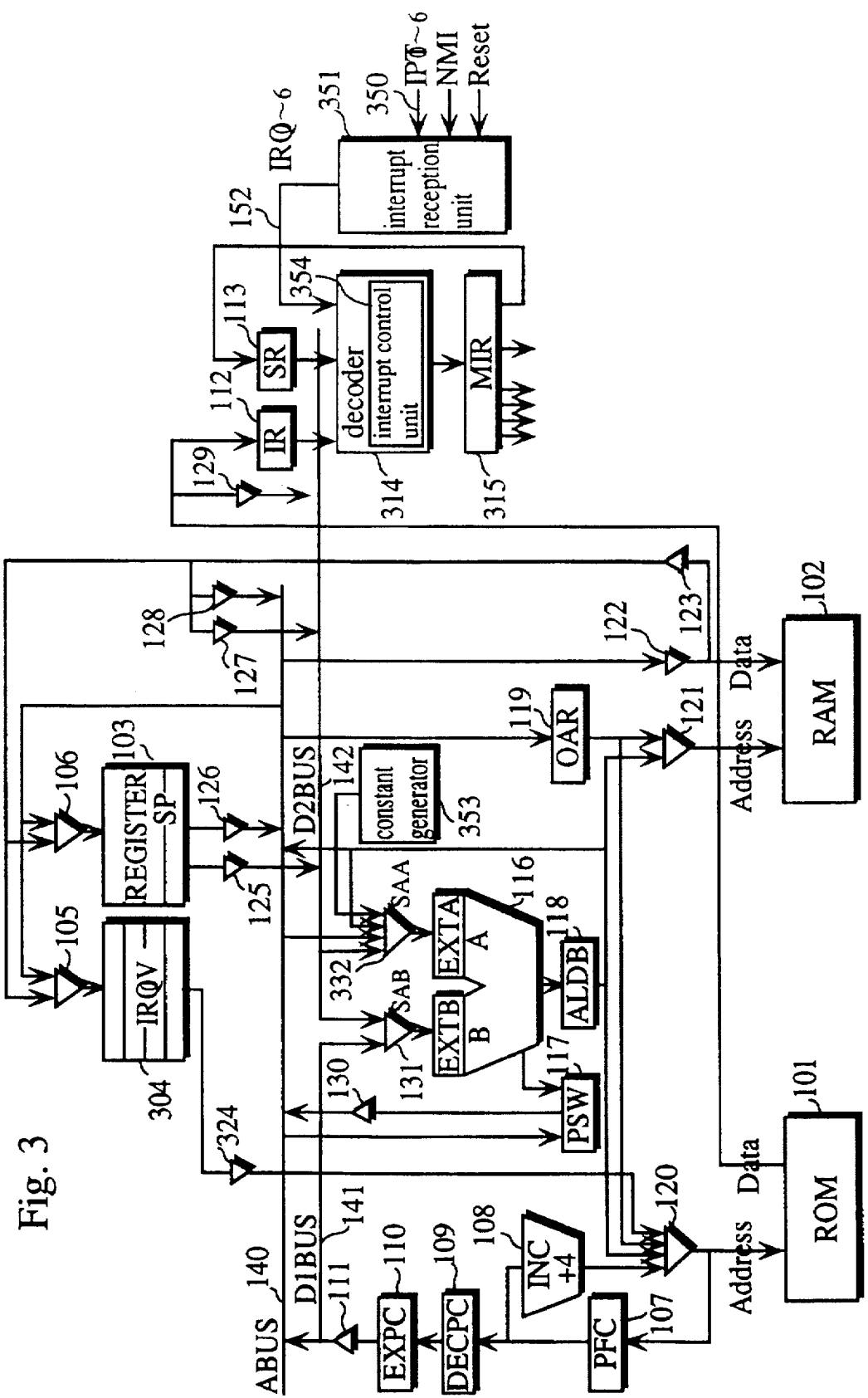
FIG. 3 is a block diagram showing a configuration of a processor comprising an interrupt control device of Embodiment 2 of the present invention.

FIG. 3 is a block diagram showing configuration of a processor comprising an interrupt control device of Embodiment 2 of the present invention. Here, the same components that are shown in FIG. 1 of Embodiment 1 are used with the same reference numbers, except for start address register 304, decoder 314, microinstruction register 315, driver 324, selector 332, interrupt reception unit 351, constant generator 353, and interrupt control unit 354. The following explanation touches on only the differences with Embodiment 1.

Start address registers 304 are composed of seven registers (IRQV0–IRQV6), each corresponding to interrupt level signals 152 (level 0–level 7), like start address registers 104 of Embodiment 1. However, one point is different: each of IRQV0–IRQV6 holds 32 bits, not the low-order 16 bits, of the start address of an interrupt processing program which corresponds to an interrupt level.

Decoder 314 is the same as decoder 114 of Embodiment 1 except that it comprises interrupt control unit 354 inside.

Microinstruction register 315 outputs control signals so that a microinstruction from decoder 314 is realized.

Driver 324 receives the 32-bit start address from start address register 304 and outputs it to selector 120.

Selector 332 is the same as selector 132 of Embodiment 1 except that constant generator 353 takes the place of constant generator 153.

Figure 4:
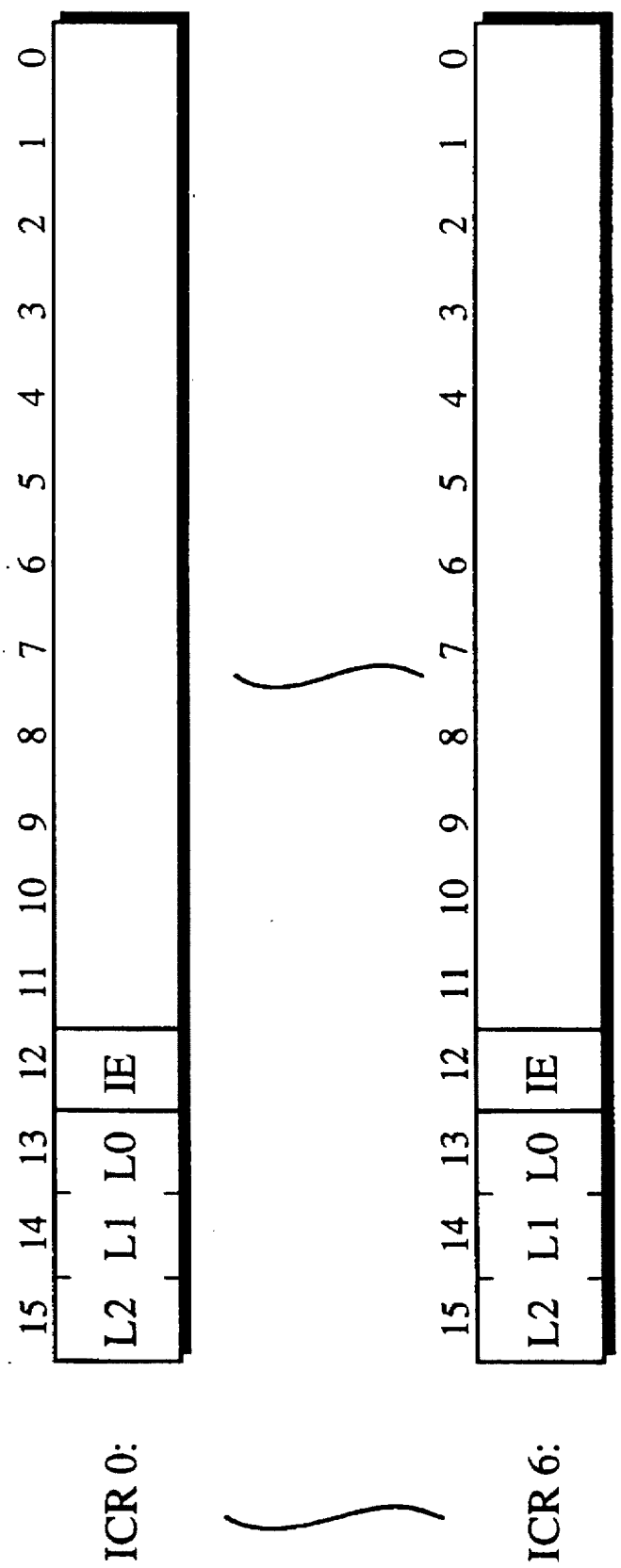
FIG. 4 shows an example of bit configuration of a control register of Embodiment 2.

Input reception unit 351 is the same as input reception unit 151 of Embodiment 1. But in the present embodiment, the contents of control registers are explained in detail. FIG. 4 shows an example of bit configuration of the control registers. In FIG. 4, ICR0–ICR6 represent seven control registers, each corresponding to interrupt signals 150 (IPT0–IPT6), respectively. Bits L2–L0 represent a level field in which priority level of each interrupt signal is set, and a bit IE represents an interrupt enable bit which shows whether an interrupt is allowed. The rest of the bits 0–11 are not used in the present embodiment. When an interrupt signal (IPT0) is inputted to interrupt reception unit 351 and the interrupt enable bit of a corresponding interrupt control register (ICR0) shows that an interrupt is allowed, interrupt reception unit 351 outputs interrupt level signal 152 (one of IRQ0–IRQ6), whose level is set in the level field.

Constant generator 353 is the same as constant generator 153 of Embodiment 1 except for one thing: constant generator 353 does not generate the 16-bit constant. Interrupt control unit 354 is actually a part of decoder 114. When one of interrupt level signals 152 is inputted, interrupt control unit 354 issues microinstructions in order to control a branch to an interrupt processing program.

Specifically, interrupt control unit 354 issues the following microinstructions when IRQn is inputted from interrupt reception unit 351: (4.1) a microinstruction to update the stack pointer (SP-8→SP); (4.2) a microinstruction to save the contents of execution program counter 110 on the stack (EFXPC→(SP-4); (4.3) a microinstruction to save the contents of processor status word 117 on the stack (PSW→SP); (4.4) a microinstruction to update IMSK field in processor status word 117 to an interrupt level of IRQn; and (4.5) a microinstruction to output IRQVn corresponding to the level of the IRQn to ROM 101 through selector 120 and store it in pre-fetch counter 107 at the same time. When the reset interrupt is inputted, the same microinstructions as (2.1) and (2.2) of Embodiment 1 are issued. When the NMI is inputted, the same microinstructions as (3.3)–(3.5) of Embodiment 1 are issued. The number of microinstructions from (4.1)–(4.5) is not necessarily fixed as mentioned above. So long as the contents are reserved, any other number is possible and they can even be consolidated into one microinstruction.

The following explanation touches on operations of the input control device of Embodiment 2 of the present invention.

Interrupt control registers ICR0–ICR6 and start address registers IRQV0–IRQV6 are set as follows.

FIG. 5A is for interrupt control registers ICR0–ICR6. FIG. 5B is for start address registers IRQV0–IRQV6. FIG. 5C is for a program needed for their setting.

FIG. 5A shows ICR0 is set at level 0, ICR1 at level 1, ICR2–ICR5 at level 2, and ICR6 at level 3. In other words, level 0 is assigned to IPT0, level 1 to IPT1, and level 2 to IPT2–IPT5, and level 3 to IPT6. In this case, interrupt processing program of level 0 corresponds to IPT0, and interrupt processing program of level 1 corresponds to IPT1. And interrupt processing program of level 2 corresponds to IPT2–IPT5. This example case is created on the assumption that a high-speed communication I/O device is connected to the processor. Here, reception processing by which each data received by the communication I/O device is transferred to the processor, and transmission processing by which data to be transmitted from the communication I/O device is transferred to the communication I/O device are realized by interrupt processing. It is essential that such reception processing and transmission processing be executed quickly and promptly so as to keep up with the communication speed (which is to say, the interrupt processing must be completed in the intervals between the reception and transmission of such data). For such a set up, the reception interrupt signal and transmission interrupt signal are set at IPT0 and IPT1 respectively, which sets their interrupt levels at 0 and 1. When IPT2–IPT6 are for interrupt processing which does not require quickness and promptness, they can be set at the same level or at any levels arbitrarily as shown in FIG. 5A.

FIG. 5B shows interrupt processing programs of level 0–level 3 have the size of 8 Kbytes (2000h bytes), 4 Kbytes (1000h), 16 Kbytes (4000h), and 1 Kbyte (400h), respectively. For example, when the start address of an interrupt processing program of level 0 is set at 40000010h, IRQV0 is set at 40000010h. Then the interrupt processing program is located between 40000010h and 4000200Fh. In order to locate an interrupt processing program of level 1 right after that, IRQV1 should be set at 40002010h. An interrupt processing program of level 2 should correspond to each of interrupt signals IPT2–IPT5, and IRQV2 should be set at 40003010h. Likewise, IRQV3 should be set at 40007010h, so that the interrupt processing programs are located without intervals.

FIG. 5C shows an example of a program for the above setting. ICR0–ICR6 and IRQV0–IRQV3 are set by transfer instructions (MOV instructions). IRQV4–IRQV6 are not set, as they are not used.

Next explanation touches on a branch to an interrupt processing program of a level interrupt.

Here, ICR0–ICR6 and IRQV0–IRQV3 are set as shown in FIG. 5, and IPT0 is inputted.

Interrupt signal IPT0 is converted to, by interrupt reception unit 351, interrupt level signal IRQ0 of level 0 designated by a level field of ICR0. Then, IRQ0 is outputted to decoder 314. Interrupt control unit 354 in decoder 314 issues the following microinstructions when IRQ0 is inputted: (4.1) a microinstruction to update the stack pointer (SP-8→SDP); (4.2) a microinstruction to save the contents of decode program counter 109 on the stack (EXPC→(SP-4)); (4.3) a microinstruction to save the contents of processor status word 117 on the stack (PSW→SP); (4.4) a microinstruction to update IMSK field in processor status word 117 to the level of the IRQ0; and (4.5) a microinstruction to output IRQV0, which corresponds to the IRQ0, to ROM 101 and store it in pre-fetch counter 107 at the same time.

Microinstruction register 115 outputs various control signals so that the microinstructions mentioned above are realized. Depending on a microinstruction from (4.1)–(4.5), microinstruction register 115 outputs control signals so that stack pointer is updated or previous address and PSW are saved.

According to the microinstruction of (4.5), microinstruction register 115 outputs control signals so that the 32-bit start address (40000010h) of an interrupt processing program is outputted to ROM 101 as a fetch address from IRQV0, which corresponds to the IRQ0 (start address register 304→selector 120→ROM 101) and it is stored in pre-fetch counter 107 at the same time (selector 120→prefetch counter 107). Then, a program branches to 40000010h, and an interrupt processing program of level 0 stored between 40000010h and 4000200Fh in ROM 101 is executed.

Unlike the operations mentioned above, interrupt levels can be changed dynamically. Here is an example of FIG. 5A. In order to assign higher priority to IPT6 than IPT2–IPT5 when interrupt processing due to IPT0 and IPT1 is completed and IPT0 and IPT1 are not used anymore, level field of ICR6 should be set at 0 again, and IRQV0 should be set at the start address (40007010h) of an interrupt processing program of level 6 again. Such setting can also be realized by transfer instructions as shown in FIG. 5C.

If interrupt processing due to IPT0 and IPT1 should occur after that, original setting should be restored.

Moreover, dynamic switching between interrupt processing programs during one interrupt factor is possible. When an interrupt factor of IPT6 is a timer interrupt used for measuring intervals between buzzing times of a buzzer and intervals between warnings on display, it is possible to switch interrupt processing programs by storing the start address of an interrupt processing program for the former case or the start address of an interrupt program for the latter case in IRQV6 according to necessity.

As mentioned above, when interrupt signals 150 are inputted, the interrupt control device of the present embodiment causes a branch to the start address given in start address register 304 according to a level designated by the interrupt control register. As the start address can be set arbitrarily, the interrupt processing programs for each level can be located in sequential areas in ROM 101, enabling more effective use of ROM 101. Moreover, as the interrupt processing programs do not bifurcate, a branch instruction for further branching to the main part of the interrupt processing programs after a branch to the start of the processing programs is not necessary. So high-speed interrupt processing can be realized. Moreover, priority levels of interrupt signals 150 can be set arbitrarily. A high level is assigned to an interrupt factor, which requires quickness and promptness of interrupt processing, and low levels are assigned to interrupt factors which do not require neither of them. Therefore, flexibility of interrupt control increases.

According to the present interrupt control device, the vector table is not needed. Therefore, its hardware configuration becomes simple.

Moreover, instead of start address registers 104 and 304 in the above embodiments, an I/O register can be used. In such a case, the I/O register is mapped into a memory area like ROM 101 and RAM 102.

Moreover, in Embodiments 1 and 2, the start address is fixed by constant generators 153 and 353 when the reset interrupt and the NMI occur. But IRQV for the reset interrupt and IRQV for the NMI can be set and treated in the same manner as the level interrupt.

Although the present invention has been fully described by way of examples with reference to the accompanying drawings, it is to be noted that various changes and modifications will be apparent to those skilled in the art. Therefore, unless otherwise such changes and modifications depart form the scope of the present invention, they should be construed as being included therein.

What is claimed is:

1. An interrupt control device for an embedded microcomputer including I/O devices and a processor core comprising:

program storage means for storing interrupt processing programs, each corresponding to an interrupt level signal, in sequential areas;

start address hold means for holding start addresses, which are updatable, of the interrupt processing programs;

level hold means for holding an interrupt level, which are updatable, of each interrupt signal;

interrupt reception means for, when at least one out of a plurality of interrupt signals inputted from the I/O devices becomes effective, receiving an interrupt signal of a highest interrupt level out of the inputted interrupt signals and outputting an interrupt level signal of the same interrupt level; and control means for controlling a branch, when the interrupt level signal is outputted, by fetching one of the start addresses which corresponds to the interrupt level of the interrupt request signal from the start address hold means and setting the start address in a program counter.

2. The interrupt control device of claim 1, wherein the start address hold means includes:
- low-order address hold means for holding a low-order address of the start address of the interrupt processing program of each level;
- constant generation means for generating a constant to be used as a high-order address of the start address, and
- wherein the control means controls the branch to the start address composed of the low-order address of the low-order address hold means and the high-order address generated from the constant generation means when the interrupt request signal occurs, the high-order and low-order addresses corresponding to the interrupt level of the interrupt request.

3. The interrupt control device of claim 1, wherein the start address hold means includes:
- first hold means for holding a leading address of the sequential areas of interrupt processing programs in the program storage means as a base address; and
- second hold means for holding a relative start address expressed by a differential between the start address of each interrupt processing program and the base address, the relative start address corresponding to an interrupt level of each interrupt processing program,
- wherein the control means controls the branch to the start address when the interrupt level signal is outputted, the start address being obtained by adding the base address and the relative start address, each corresponding to the interrupt level of the interrupt request.

4. The interrupt control device of claim 1, further comprises:
- fixed address generation means for generating a start address of an interrupt processing program for a specific non-maskable interrupt level signal, and
- wherein the control means controls a branch to the start address generated by the fixed address generation means when the specific non-maskable interrupt level signal occurs.

5. The interrupt control device of claim 1, wherein one interrupt level signal having an interrupt level higher than a predetermined level corresponds to one interrupt processing program in the program storage means, and a plurality of interrupt level signals, each having an interrupt level one of equal to and lower than the predetermined level, correspond to one interrupt processing program in the program storage means, and
wherein the start address hold means includes:
- first hold means for holding the start address corresponding to the interrupt level higher than the predetermined level; and
- second hold means for holding the start address corresponding to a plurality of interrupt levels which are one of equal to and lower than the predetermined level.

6. The interrupt control device of claim 1, wherein the level hold means includes the same number of interrupt control registers as the interrupt signals, each interrupt control register having an interrupt level setting field.

7. The interrupt control device of claim 6 further includes:
- first initialization means for setting each start address of the interrupt processing programs in the start address hold means right after the microcomputer is activated; and
- second initialization means for setting each level of the interrupt processing programs in the interrupt control registers right after the microcomputer is activated.

8. The interrupt control device of claim 7 further includes setting change means for dynamically changing, when the microcomputer in activation, at least one of the level in the interrupt control register and a start address in the start address hold means corresponding to one of the interrupt processing programs.

9. The interrupt control device of claim 6, wherein the program storage means further includes a first program for setting each start address of the interrupt processing programs in the start address hold means and a second program for setting each level of the interrupt processing programs in the interrupt control registers,
wherein the first and the second programs are executed by the processor core right after the microcomputer is activated.

10. The interrupt control device of claim 9, wherein the program storage means further includes a third program for changing at least one of the level in the interrupt control register and the start address in the start address hold means, each corresponding to one of the interrupt processing programs,
wherein the third program is dynamically executed by processor core when the microcomputer in activation.

11. An interrupt control device for controlling a microcomputer response to requested interrupt signals from a plurality of I/O devices, comprising:
- program storage means for storing interrupt processing programs, each corresponding to an interrupt level signal, in sequential areas;
- start address hold means for holding start addresses, which are updatable, of the interrupt processing programs;
- level hold means for holding a plurality of interrupt levels, which are updatable, each interrupt level can correspond to one or more interrupt signals;
- interrupt reception means for, when at least one out of a plurality of interrupt signals inputted from the I/O devices becomes effective, selecting an interrupt signal of a highest interrupt level out of the inputted interrupt signals and outputting an interrupt level signal of the same interrupt level; and
- control means for controlling a branch, when the interrupt level signal is outputted, by fetching one of the start addresses which corresponds to the interrupt level of the interrupt request signal from the start address hold means and setting the start address in a program counter, the number of interrupt signals exceeds the number of interrupt levels.

12. An interrupt control device for controlling a microcomputer response to requested interrupt signals from a plurality of I/O devices, comprising:
- program storage means for storing interrupt processing programs, each corresponding to an interrupt level signal;
- start address hold means for holding start addresses, which are updateable, of the interrupt processing programs;
- level hold means for holding a plurality of interrupt levels, which are updateable, each interrupt level can correspond to one or more interrupt signals;
- interrupt reception means for, when at least one out of a plurality of interrupt signals inputted from the I/O devices becomes effective, selecting an interrupt signal of a highest interrupt level out of the inputted interrupt signals and outputting an interrupt level signal of the same interrupt level; and control means for controlling a branch, when the interrupt level signal is outputted, by fetching one of the start addresses which corresponds to the interrupt level of the interrupt request signal from the start address hold means and setting the start address in a program counter, the start address hold means includes a constant generator for generating a constant to be used as a portion of a start address to be fetched.

* * * * *